United States Patent
Tkal

(10) Patent No.: US 8,281,133 B1
(45) Date of Patent: Oct. 2, 2012

(54) PREDICTIVE REAL-TIME PAIRWISE MASTER KEY IDENTIFICATION (PMKID) GENERATION

(75) Inventor: Erik Tkal, Leominster, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 657 days.

(21) Appl. No.: 12/350,649

(22) Filed: Jan. 8, 2009

(51) Int. Cl.
*H04L 9/32* (2006.01)
(52) U.S. Cl. ...................................................... 713/171
(58) Field of Classification Search ................... 713/171
See application file for complete search history.

(56) References Cited

U.S. PATENT DOCUMENTS

| | | | | |
|---|---|---|---|---|
| 2006/0083200 | A1* | 4/2006 | Emeott et al. | 370/331 |
| 2006/0256763 | A1* | 11/2006 | Nguyen et al. | 370/338 |
| 2007/0110009 | A1* | 5/2007 | Bachmann et al. | 370/338 |
| 2008/0065884 | A1* | 3/2008 | Emeott et al. | 713/168 |
| 2009/0067623 | A1* | 3/2009 | Lei et al. | 380/44 |
| 2009/0136027 | A1* | 5/2009 | Salowey et al. | 380/45 |

OTHER PUBLICATIONS

IEEE Computer Society, "IEEE Standards 802.11i™, IEEE Standard for Information technology—Telecommunications and information exchange between systems—Local and metropolitan area networks—Specific requirements. Part 11: Wireless LAN Medium Access Control (MAC) and Physical Layer (PHY) specifications, Amendment 6: Medium Access Control (MAC) Security Enhancements", Jul. 23, 2004, 190 pages.

* cited by examiner

*Primary Examiner* — Jason K. Gee
*Assistant Examiner* — Abiy Getachew
(74) *Attorney, Agent, or Firm* — Harrity & Harrity, LLP

(57) ABSTRACT

A device receives, from a wireless access point, a pairwise master key identification (PMKID) based on a known pairwise master key (PMK), and determines whether the received PMKID matches one of multiple PMKIDs stored in a cache associated with the device. The device dynamically generates a PMKID based on the known PMK when the received PMKID does not match one of the multiple PMKIDs stored in the cache, and performs a fast four-way handshake to establish a secure connection between the device and the wireless access point when the dynamically generated PMKID matches the received PMKID.

13 Claims, 11 Drawing Sheets

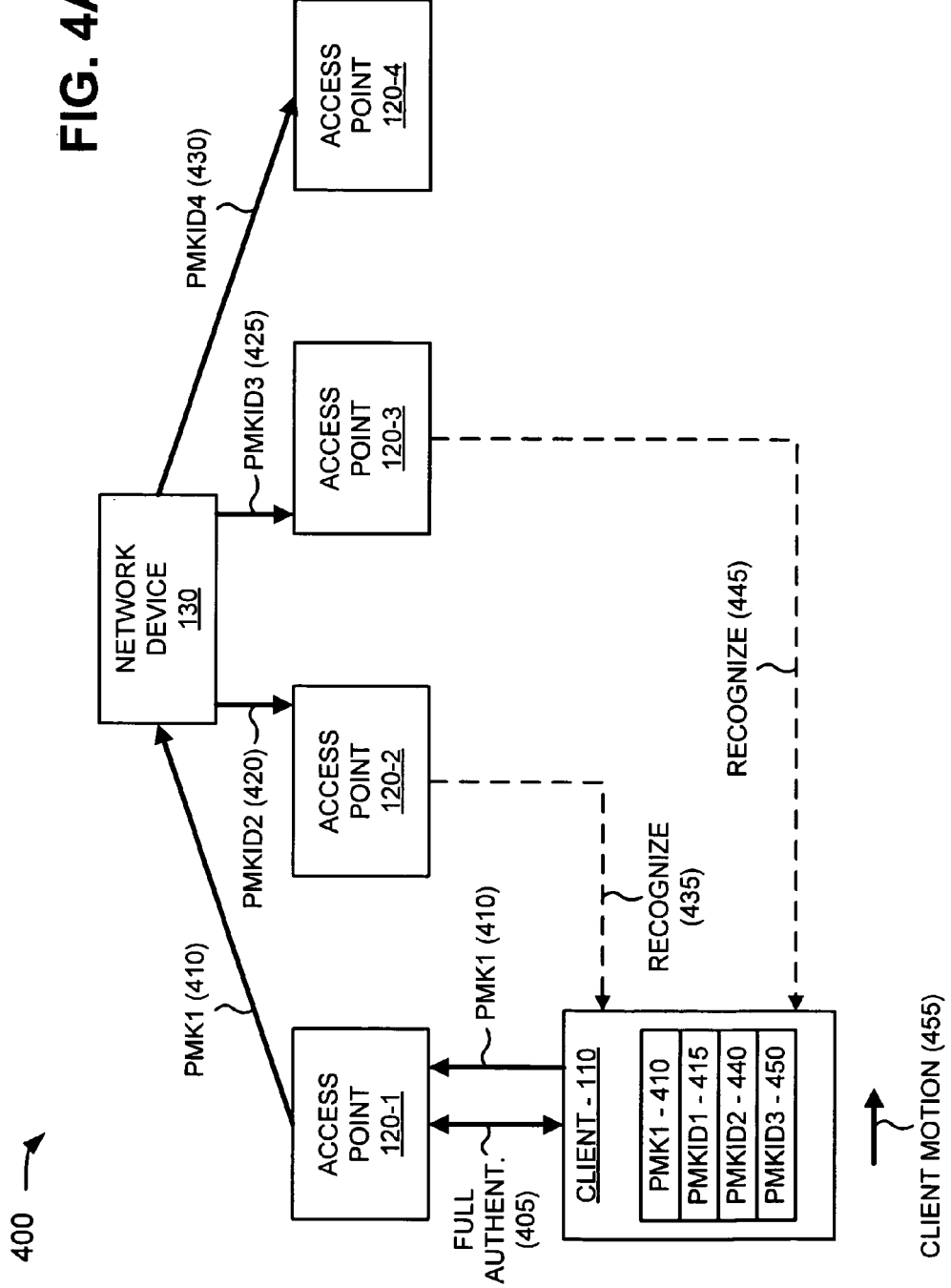

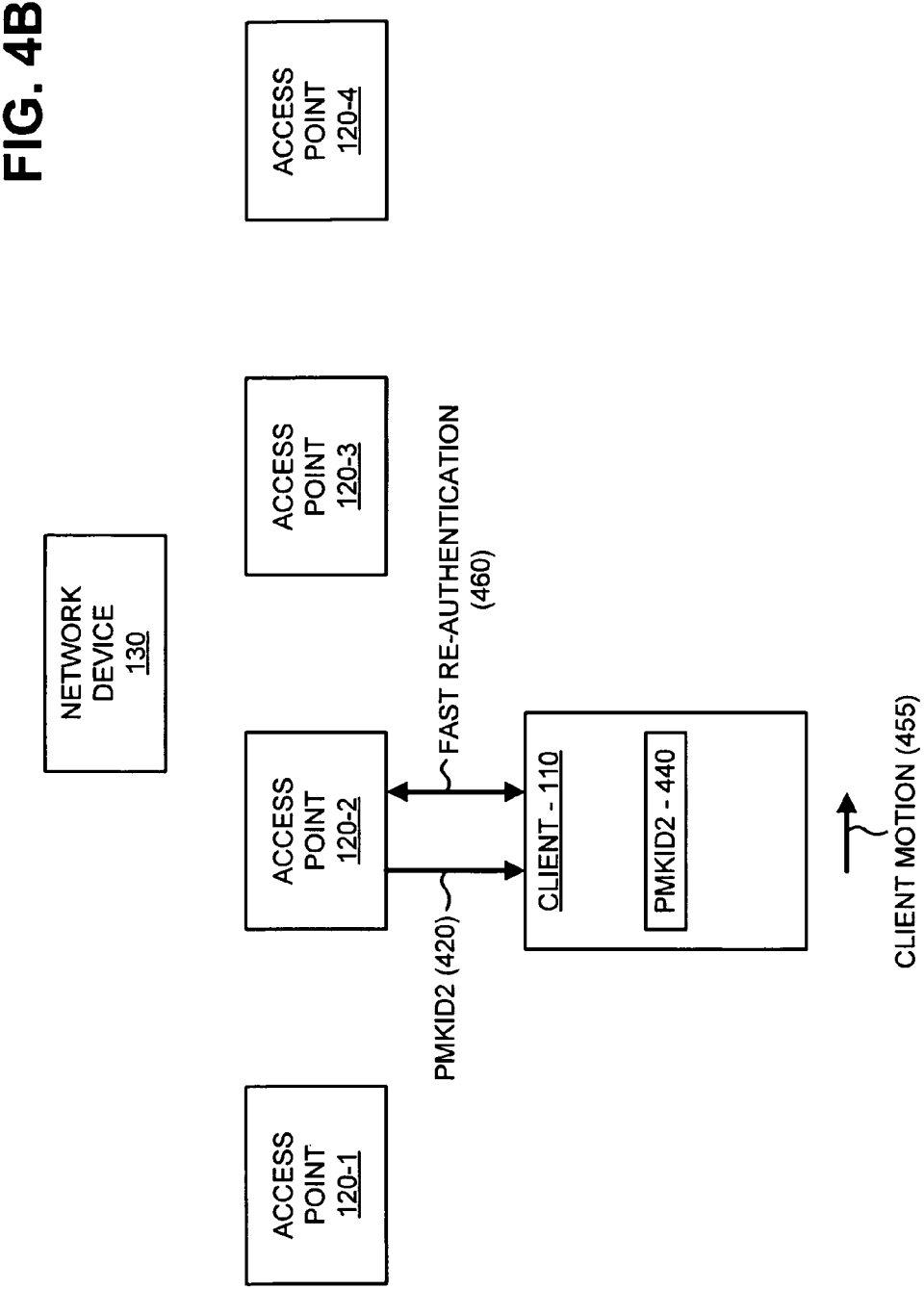

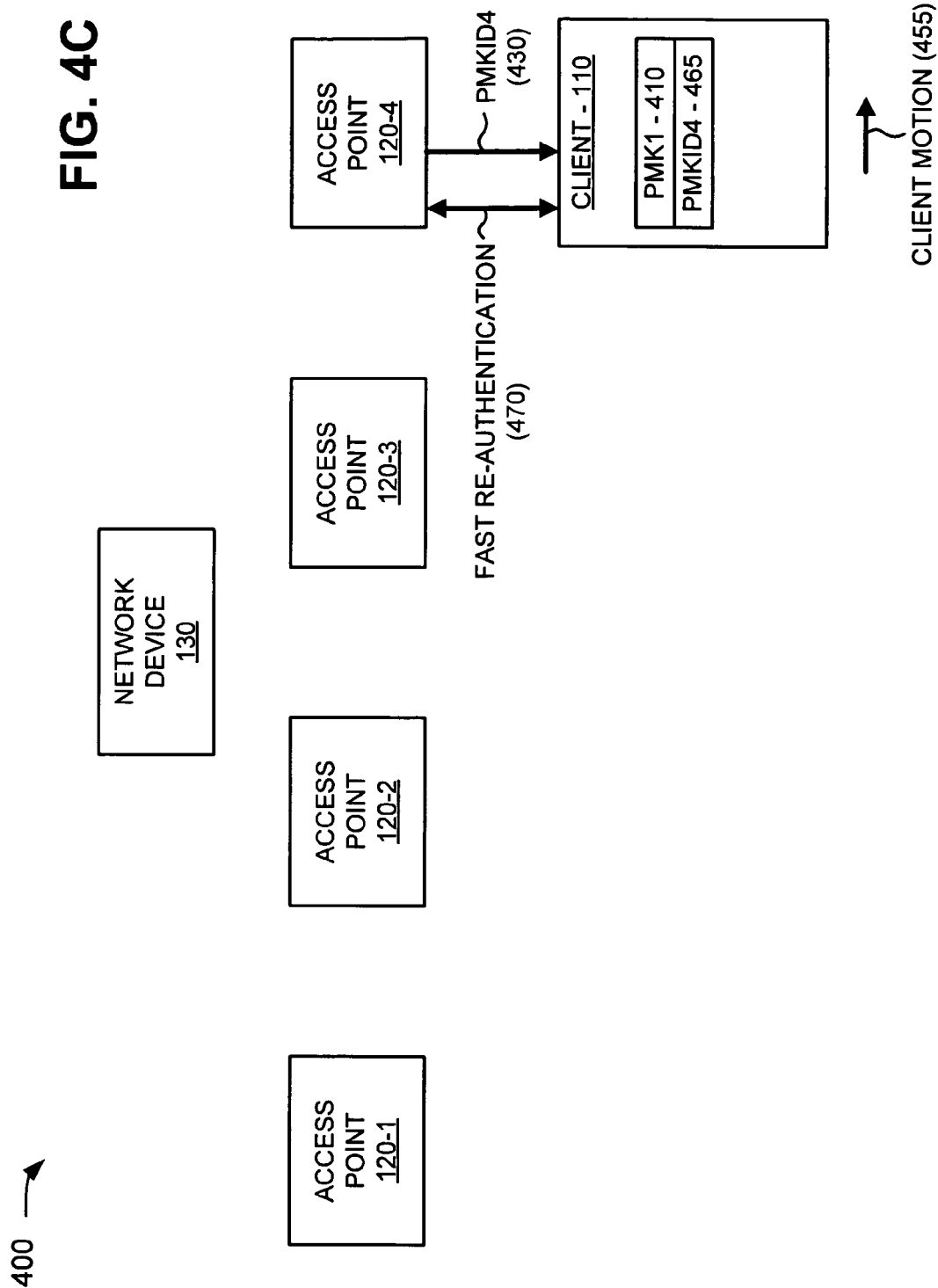

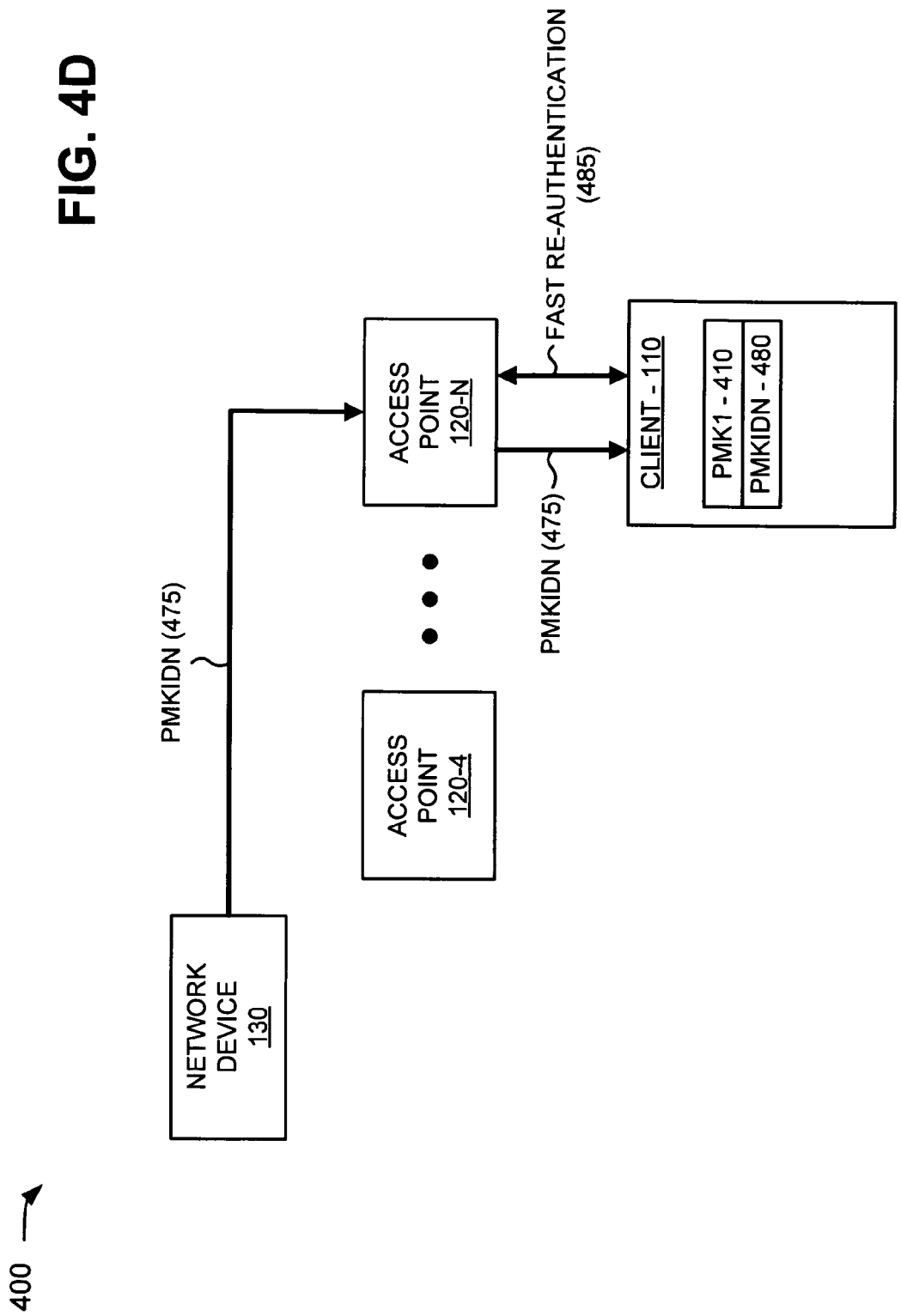

PREDICTIVE REAL-TIME PAIRWISE MASTER KEY IDENTIFICATION (PMKID) GENERATION

BACKGROUND

A robust security network (RSN), such as a Wi-Fi Protected Access 2 (WPA2)-based network (e.g., using a security method that provides data protection and network access control), includes a mechanism for establishing a secure wireless connection with a client device. With such a mechanism, an access point of the network (e.g., that recognizes the wireless client device) may provide a pairwise master key identification (PMKID) to the client. The PMKID may refer to a previous authentication and enables the access point and the client to reestablish a secure connection via a fast four-way handshake (e.g., method used by a client and an authenticator (e.g., an access point) to derive pairwise transient keys (PTKs) which are used for encrypting data frames). The PMKID is generated from a pairwise master key (PMK) and media access control (MAC) addresses of the client and the access point. If the PMKID sent by the access point is not recognized by the client, a full authentication of the client must occur (e.g., requiring the client to provide a password and/or other authentication information). The full authentication process may consume a substantial amount of time and may disrupt connection of the client with the network.

Current RSN implementations (e.g., used by a wireless network interface card or wireless card associated with the client) report a list of potential roaming candidates (e.g., access points) in a wireless network. The wireless client can pre-calculate PMKIDs using a most recent encryption key (e.g., the most recent PMK) and the MAC addresses for each of the access points. The client can add the pre-calculated PMKIDs to its cache along with other PMKIDs corresponding to previously successful authentications. Such an arrangement is called "opportunistic key caching" and is based on the assumption that a smart switch (e.g., associated with the RSN) manages the access points or that the access points share encryption keys (e.g., PMKs) through some mechanism. However, the number of access points reported by the wireless card to the client is limited, and, in many cases, is significantly fewer than the number of available access points. Thus, if the client attempts to roam to an access point not reported by the wireless card, a full authentication of the client must occur.

Many RSN environments include multiple access points controlled by a switch. The switch may be aware of wireless clients and may store encryption keys in order to speed up subsequent wireless connections when a client roams to another access point on the same wireless network. Opportunistic key caching allows the wireless client to pre-calculate a limited number of potential future associations (e.g., with access points). However, there is no guarantee that the client will roam to one of these access points.

SUMMARY

According to one aspect, a device may include a memory to store a plurality of instructions, and a processor to execute instructions in the memory to receive, from a wireless access point, a pairwise master key identification (PMKID) based on a known pairwise master key (PMK), and determine whether the received PMKID matches one of multiple PMKIDs stored in a cache associated with the memory. The processor may execute instructions in the memory to dynamically generate a PMKID based on the known PMK when the received PMKID does not match one of the multiple PMKIDs stored in the cache, and perform a fast four-way handshake to establish a secure connection between the device and the wireless access point when the dynamically generated PMKID matches the received PMKID.

According to another aspect, a device may include a memory to store a plurality of instructions, and a processor to execute instructions in the memory to perform a full authentication to establish a secure connection between a client and a first wireless access point, receive an encryption key from the client via the first wireless access point, and generate an encryption key identification for a second wireless access point based on the encryption key. The processor may also execute instructions in the memory to provide the encryption key identification to the second wireless access point, where the second wireless access point may perform a fast four-way handshake to establish a secure connection with the client based on an encryption key identification, dynamically generated by the client, that matches the provided encryption key identification.

According to still another aspect, a computing device-implemented method may include receiving, from a wireless access point and via a processor associated with the computing device, an encryption key identification based on a known encryption key, and determining, via the processor, whether the received encryption key identification matches one of multiple encryption key identifications stored in a cache associated with the computing device. The method may also include dynamically generating, via the processor, an encryption key identification based on the known encryption key when the received encryption key identification does not match one of the multiple encryption key identifications stored in the cache, and performing, via the processor, a fast authentication to establish a secure connection between the computing device and the wireless access point when the dynamically generated encryption key identification matches the received encryption key identification.

According to a further aspect, a computing device-implemented method may include performing, via a processor associated with the computing device, a full authentication to establish a secure connection between a client and a first wireless access point, receiving, via the processor, an encryption key from the client via the first wireless access point, and generating, via the processor, an encryption key identification for a second wireless access point based on the encryption key. The method may also include providing, via the processor, the encryption key identification to the second wireless access point, where the second wireless access point may perform a fast four-way handshake to establish a secure connection with the client based on an encryption key identification, dynamically generated by the client, that matches the provided encryption key identification.

According to still a further aspect, a device may include means for receiving, from a wireless access point, a pairwise master key identification (PMKID) based on a known pairwise master key (PMK), means for determining whether the received PMKID matches one of multiple PMKIDs stored in a cache associated with the memory, and means for dynamically generating a PMKID based on the known PMK when the received PMKID does not match one of the multiple PMKIDs stored in the cache. The device may also include means for determining whether the dynamically generated PMKID matches the received PMKID, means for performing a full authentication to establish a secure connection between the device and the wireless access point when the dynamically generated PMKID does not match the received PMKID, and means for performing a fast four-way handshake to establish a secure connection between the device and the wireless access point when the dynamically generated PMKID matches the received PMKID.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 4A-4D illustrate diagrams of an exemplary portion of the arrangement depicted in FIG. 1;

DETAILED DESCRIPTION

The following detailed description refers to the accompanying drawings. The same reference numbers in different drawings may identify the same or similar elements. Also, the following detailed description does not limit the invention.

Systems and/or methods described herein may generate predictive real-time pairwise master key identifications (PMKIDs) so that a fast four-way handshake may be used to establish a secure connection between a client and an access point. For example, in one implementation, the systems and/or methods may enable a client to recognize when an access point could potentially have been a roaming candidate, even if the access point was not reported by a wireless card associated with the client. If the access point sends a PMKID but the client does not have the PMKID cached, the client may predict that a current encryption key (e.g., a current PMK) may be correct and may dynamically generate a PMKID based on the current encryption key. If the newly-generated PMKID matches the received PMKID, the client may establish a secure connection via a fast four-way handshake and may bypass full authentication. Such an arrangement may be utilized with a network device that stores (e.g. in a cache) encryption keys for each client-access point association, or with a client that uses its current encryption key for future associations with the same network. If the client roams within a single network, a single full authentication may initially be performed and subsequent connections may use a fast four-way handshake.

Exemplary Arrangement

Figure 1:
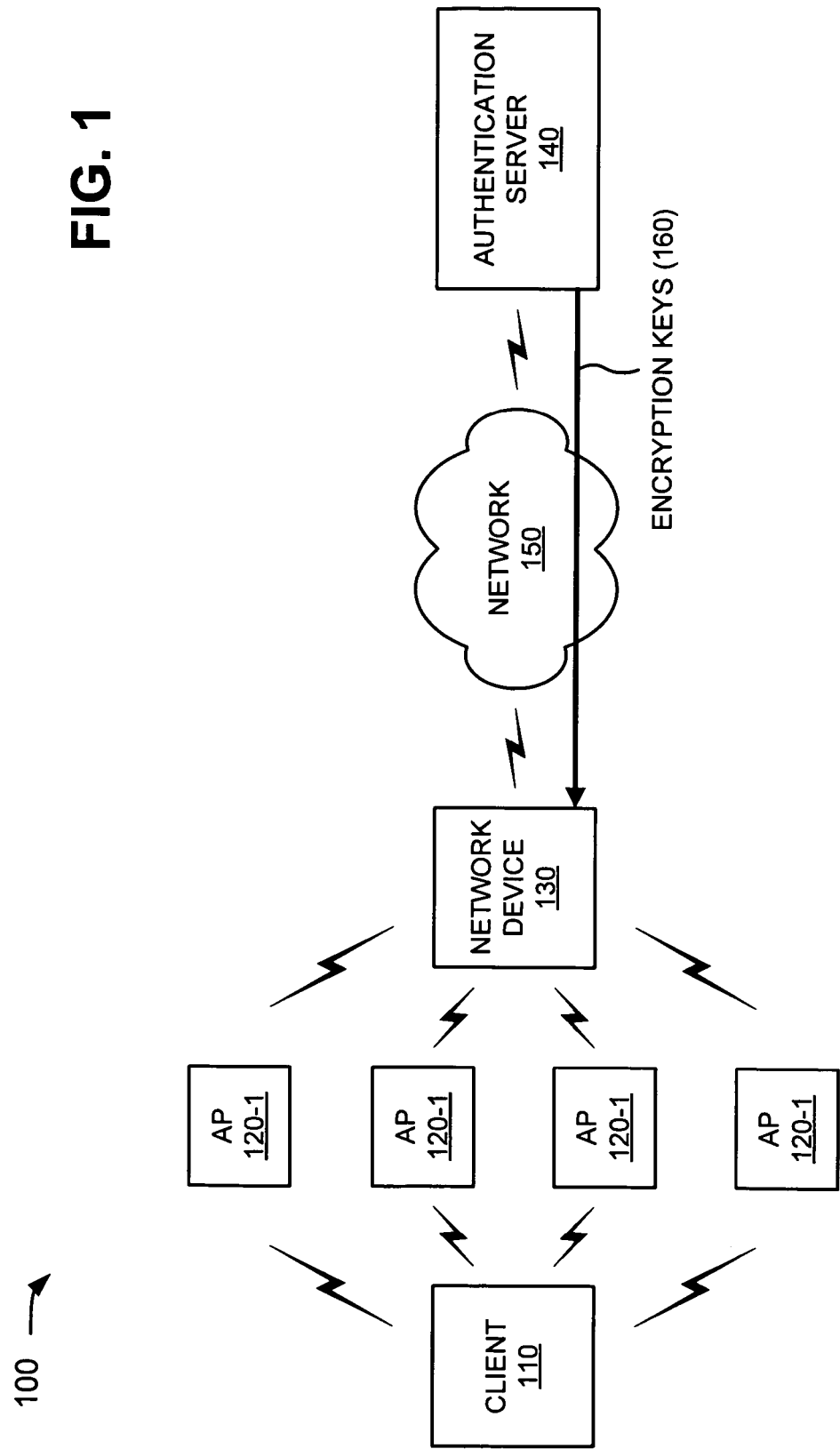
FIG. 1 depicts a diagram of an exemplary arrangement in which systems and/or methods described herein may be implemented.

FIG. 1 depicts a diagram of an exemplary arrangement 100 in which systems and/or methods described herein may be implemented. As illustrated, arrangement 100 may include a client 110, one or more access points (APs) 120-1, ..., 120-4 (referred to collectively as "access points 120" and in some instances, individually as "access point 120"), a network device 130, and an authentication server 140 interconnected by a network 150. Components of arrangement 100 may interconnect via wired and/or wireless connections. A single client 110, four access points 120, a single network device 130, a single authentication server 140, and a single network 150 have been illustrated in FIG. 1 for simplicity. In practice, there may be more clients 110, more or less access points 120, more network devices 130, more authentication servers 140, and/or more networks 150. Also, in some instances, one or more of the components of arrangement 100 may perform one or more functions described as being performed by another one or more of the components of arrangement 100.

Client 110 may include any device that is capable of accessing network 150 via one or more of access points 120 and/or via network device 130. For example, client 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a network device (e.g., a gateway, a router, a switch, a firewall, a network interface card (NIC), a hub, a bridge, a proxy server, etc.) or other types of computation or communication devices, threads or processes running on these devices, and/or objects executable by these devices. In one implementation, client 110 may recognize when an access point 120 could potentially have been a roaming candidate, even if access point 120 was not reported by a wireless card associated with client 110. If access point 120 sends a PMKID but client 110 does not have the PMKID cached, client 110 may dynamically generate a PMKID based on a current encryption key (e.g., a current PMK). If the newly-generated PMKID matches the received PMKID, client 120 may establish a secure connection with access point 120 via a fast four-way handshake and may bypass full authentication.

Access point 120 may include a device (e.g., a wireless device) that enables client 110 to securely access network 150. For example, access point 120 may include a specially configured node on a wireless network that acts as a central transmitter and receiver of wireless network radio signals. Access point 120 may include a dedicated hardware device that includes a built-in network adapter, an antenna, and a radio transmitter. In one implementation, access point 120 may include a data transfer device, such as a gateway, a router, a switch, a firewall, a network interface card (NIC), a hub, a bridge, a proxy server, or some other type of device that processes and/or transfers data.

Network device 130 may include a device (e.g., a wireless device) that enables client 110 to securely access network 150. For example, network device 130 may include a data transfer device, such as a gateway, a router, a switch, a firewall, a NIC, a hub, a bridge, a proxy server, or some other type of device that processes and/or transfers data. Network device 130 may be capable of transmitting and/or receiving network traffic (e.g., any type or form of data, such as packet or non-packet data). Network device 130 may be associated with and/or may control operation of access points 120.

Authentication server 140 may include one or more server entities, or other types of computation or communication devices, that gather, process, search, and/or provide information in a manner described herein. In one implementation, authentication server 140 may include a device that is capable of authenticating client 110 for selective access to a restricted resource (e.g., to network 150). The restricted resource may include any type or form of resource to which access may be controlled, such as a private network (e.g., a company intranet), a device (e.g., a computer, a memory device, or a peripheral), data (e.g., data associated with an account or a customer profile), or software (e.g., an email application, a word processing program, or an operating system).

Network 150 may include a local area network (LAN), a wide area network (WAN), a metropolitan area network (MAN), a telephone network, such as the Public Switched Telephone Network (PSTN) or a cellular telephone network, an intranet, the Internet, or a combination of networks. In one example, access points 120, network device 130, and/or network 150 may form a robust security network (RSN), such as a Wi-Fi Protected Access 2 (WPA2)-based network.

As further shown in FIG. 1, authentication server 140 may provide selective access to network 150 via encryption keys 160. Each of encryption keys 160 may include a string of letters, digits, and/or symbols that may be used to encode or decode a message. In one example, encryption keys 160 may include pairwise master keys (PMKs). Encryption, in general, may enable plain text (or other data) to be encoded into non-readable form, providing privacy. A receiver of the encrypted text may use one of encryption keys 160 to decrypt the message, returning it to its original plain text form. Authentication server 140 may provide encryption keys 160 to network device 130, and network device 130, via access points 120, may use encryption keys 160 to control access to network 150.

Exemplary Client/Authentication Server Configuration

Figure 2:
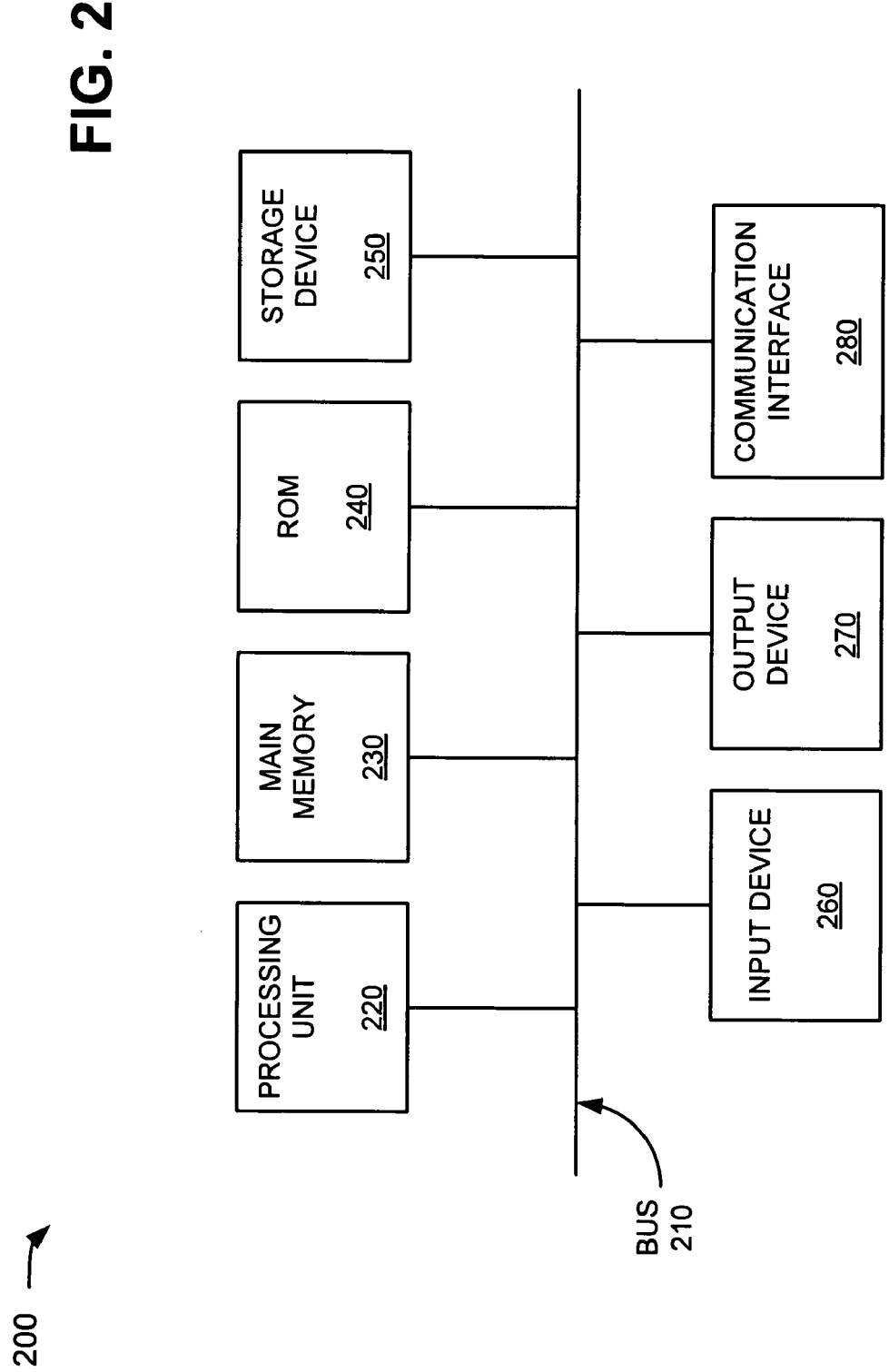
FIG. 2 illustrates a diagram of exemplary components of a client and/or an authentication server depicted in FIG. 1.

FIG. 2 illustrates a diagram of exemplary components of a device 200 that may correspond to client 110 and/or authentication server 140. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a remote control, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 150.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Exemplary Access Point/Network Device Configuration

Figure 3:
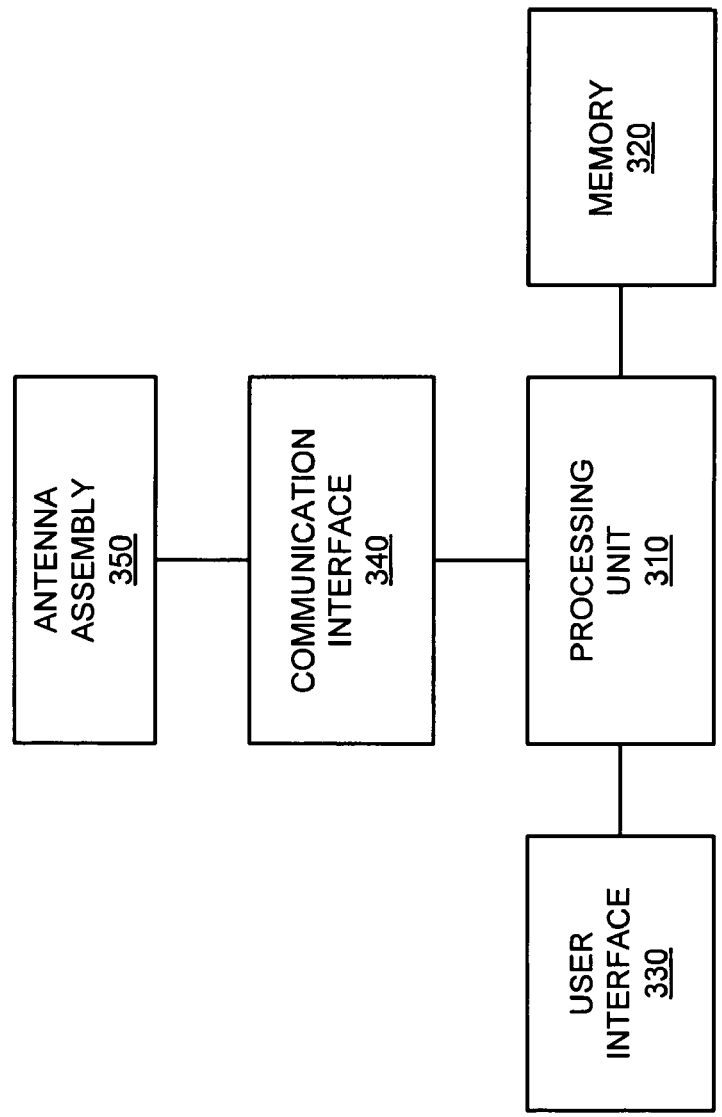
FIG. 3 depicts a diagram of exemplary components of an access point and/or a network device illustrated in FIG. 1.

FIG. 3 depicts a diagram of exemplary components of a device 300 that may correspond to one of access points 120 and/or network device 130. As shown, device 300 may include a processing unit 310, a memory 320, a user interface 330, a communication interface 340, and an antenna assembly 350.

Processing unit 310 may include one or more processors, microprocessors, application specific integrated circuits (ASICs), field programmable gate arrays (FPGAs), or the like. Processing unit 310 may control operation of device 300 and its components. In one implementation, processing unit 310 may control operation of components of device 300 in a manner described herein.

Memory 320 may include a RAM, a ROM, and/or another type of memory to store data and instructions that may be used by processing unit 310.

User interface 330 may include mechanisms for inputting information (e.g., input buttons) to device 300 and/or mechanisms for outputting information (e.g., light-emitting diodes) from device 300.

Communication interface 340 may include, for example, a transmitter that may convert baseband signals from processing unit 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and/or reception of the RF signals.

Antenna assembly 350 may include one or more antennas to transmit and/or receive signals through a radio interface. Antenna assembly 350 may, for example, receive RF signals from communication interface 340 and transmit them through the radio interface, and receive RF signals through the radio interface and provide them to communication interface 340. In one implementation, for example, communication interface 340 may communicate with a network (e.g., network 150) and/or devices connected to a network.

As described herein, device 300 may perform certain operations in response to processing unit 310 executing software instructions of an application contained in a computer-readable medium, such as memory 320. The software instructions may be read into memory 320 from another computer-readable medium or from another device via communication interface 340. The software instructions contained in memory 320 may cause processing unit 310 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, differently arranged, or additional components than depicted in FIG. 3. In still other implementations, one or more components of device 300 may perform one or more other tasks described as being performed by one or more other components of device 300.

Exemplary Interactions for Establishing Secure Connections

FIGS. 4A-4D illustrate diagrams of an exemplary portion 400 of arrangement 100, and exemplary interactions among components of exemplary arrangement portion 400. As shown, exemplary arrangement portion 400 may include client 110, access points 120, and network device 130. Client 110 may include the features described above in connection with, for example, FIGS. 1 and 2. Access points 120 and network device 130 may include the features described above in connection with, for example, FIGS. 1 and 3.

As shown in FIG. 4A, client 110 may be located closest to access point 120-1 and may perform a full authentication 405 with access point 120-1 (and/or network device 130). Full authentication 405 may include client 110 providing a password and/or other authentication information to access point 120-1. Full authentication 405 may enable client 110 to establish a secure connection with access point 120-1 so that client 110 may securely access network 150. Client 110 may generate an encryption key (e.g., PMK1) 410 and a PMKID1 415 based on full authentication 405, and may store PMK1 410 and PMKID1 415 in a cache (e.g., provided in main memory 230, ROM 240, and/or storage device 250) associated with client 110. Client 110 may provide PMK1 410 to access point 120-1, and access point 120-1 may provide PMK1 410 to network device 130.

Network device 130 may receive PMK1 410 from access point 120-1, and may generate PMKIDs for each of access points 120-2, 120-3, and 120-4 associated with network device 130. For example, network device 130 may generate a PMKID2 420 for access point 120-2, may generate a PMKID3 425 for access point 120-3, and may generate a PMKID4 430 for access point 120-4. Network device 130 may provide PMKID2 420, PMKID3 425, and PMKID4 430 to access points 120-2, 120-3, and 120-4, respectively.

As further shown in FIG. 4A, client 110 may be close enough to access point 120-2 to recognize 435 (or detect) access point 120-2. When client 110 recognizes 435 access point 120-2, client 110 may generate a speculative PMKID2 440 based on PMK1 410, and may store PMKID2 440 in the cache associated with client 110. Client 110 may also be close enough to access point 120-3 to recognize 445 (or detect) access point 120-3. When client 110 recognizes 445 access point 120-3, client 110 may generate a speculative PMKID3 450 based on PMK1 410, and may store PMKID3 450 in the cache associated with client 110. Client 110 may not be close enough to access point 120-4 to recognize (or detect) access point 120-4. Thus, access point 120-2 may be an "unknown" access point for client 110. Client 110 may move (e.g., a user associated with client 110 may move to a new location) in a direction indicated by client motion 455. As used herein, the term "user" is intended to be broadly interpreted to include a client or a user of a client. Client motion 455 may move client 110 away from access point 120-1 and towards access points 120-2, 120-3, and 120-4.

As shown in FIG. 4B, client motion 455 may move client 110 to a location that may be closest to access point 120-2 (e.g., a "known" access point). Access point 120-2 may provide PMKID2 420 (e.g., received from network device 130) to client 110, and client 110 may receive PMKID2 420. Client 110 may compare the received PMKID2 420 with PMKIDs stored in the cache associated with client 110. If the received PMKID2 420 matches one of the PMKIDs (e.g., matches PMKID2 440) stored in the cache associated with client 110, client 110 and access point 120-2 may perform a fast re-authentication 460 to establish a secure connection between client 110 and access point 120-2. Fast re-authentication 460 may include client 110 and access point 120-2 performing a fast four-way handshake to establish a secure connection between client 110 and access point 120-2. As further shown in FIG. 4B, client 110 may continue to move in a direction indicated by client motion 455. Client motion 455 may move client 110 away from access points 120-1 and 120-2 and towards access points 120-3 and 120-4.

As shown in FIG. 4C, client motion 455 may move client 110 to a location that may be closest to access point 120-4 (e.g., an "unknown" access point). Access point 120-4 may provide PMKID4 430 (e.g., received from network device 130) to client 110, and client 110 may receive PMKID4 430. Client 110 may compare the received PMKID4 430 with PMKIDs stored in the cache associated with client 110. When access point 120-4 is "unknown" to client 110, the received PMKID4 430 will not match one of the PMKIDs stored in the cache associated with client 110. In prior arrangements, client 110 would have to perform a full authentication with access point 120-4 in such situations. However, in implementations described herein, when the received PMKID4 430 does not match one of the PMKIDs stored in the cache associated with client 110, client 110 may dynamically generate a PMKID (e.g., a PMKID4 465) based on PMK1 410 and may store PMKID4 465 in the cache associated with client 110.

Client 110 may determine whether the received PMKID 430 matches the dynamically generated PMKID4 465. If the received PMKID4 430 matches the dynamically generated PMKID4 465, client 110 and access point 120-4 may perform a fast re-authentication 470 to establish a secure connection between client 110 and access point 120-4. Fast re-authentication 470 may include client 110 and access point 120-4 performing a fast four-way handshake to establish a secure connection between client 110 and access point 120-4. If the received PMKID4 430 does not match the dynamically generated PMKID4 465, client 110 and access point 120-4 may perform a full authentication to establish a secure connection between client 110 and access point 120-4. As further shown in FIG. 4C, client 110 may continue to move in a direction indicated by client motion 455. Client motion 455 may move client 110 away from access points 120-1, 120-2, 120-3, and 120-4.

As shown in FIG. 4D, client motion 455 may move client 110 to a location that may be closest to an access point 120-N (e.g., an "unknown" access point). Access point 120-N may include the features of access points 120, described above in connection with FIGS. 1 and 3. Access point 120-N may provide a PMKIDN 475 (e.g., received from network device 130) to client 110, and client 110 may receive PMKIDN 475. Client 110 may compare the received PMKIDN 475 with PMKIDs stored in the cache associated with client 110. When the received PMKIDN 475 does not match one of the PMKIDs stored in the cache associated with client 110 (e.g., when access point 120-N is "unknown" to client 110), client 110 may dynamically generate a PMKID (e.g., a PMKIDN 480) based on PMK1 410 and may store PMKIDN 480 in the cache associated with client 110.

If the received PMKIDN 475 matches the dynamically generated PMKIDN 480, client 110 and access point 120-N may perform a fast re-authentication 485 to establish a secure connection between client 110 and access point 120-N. Fast re-authentication 485 may include client 110 and access point 120-N performing a fast four-way handshake to establish a secure connection between client 110 and access point 120-N. If the received PMKIDN 475 does not match the dynamically generated PMKIDN 480, client 110 and access point 120-N may perform a full authentication to establish a secure connection between client 110 and access point 120-N.

Although FIGS. 4A-4D show exemplary components of arrangement portion 400, in other implementations, arrangement portion 400 may contain fewer, different, differently arranged, or additional components than depicted in FIGS. 4A-4D. In still other implementations, one or more components of arrangement portion 400 may perform one or more other tasks described as being performed by one or more other components of arrangement portion 400.

Exemplary Client Operations

Figure 5:
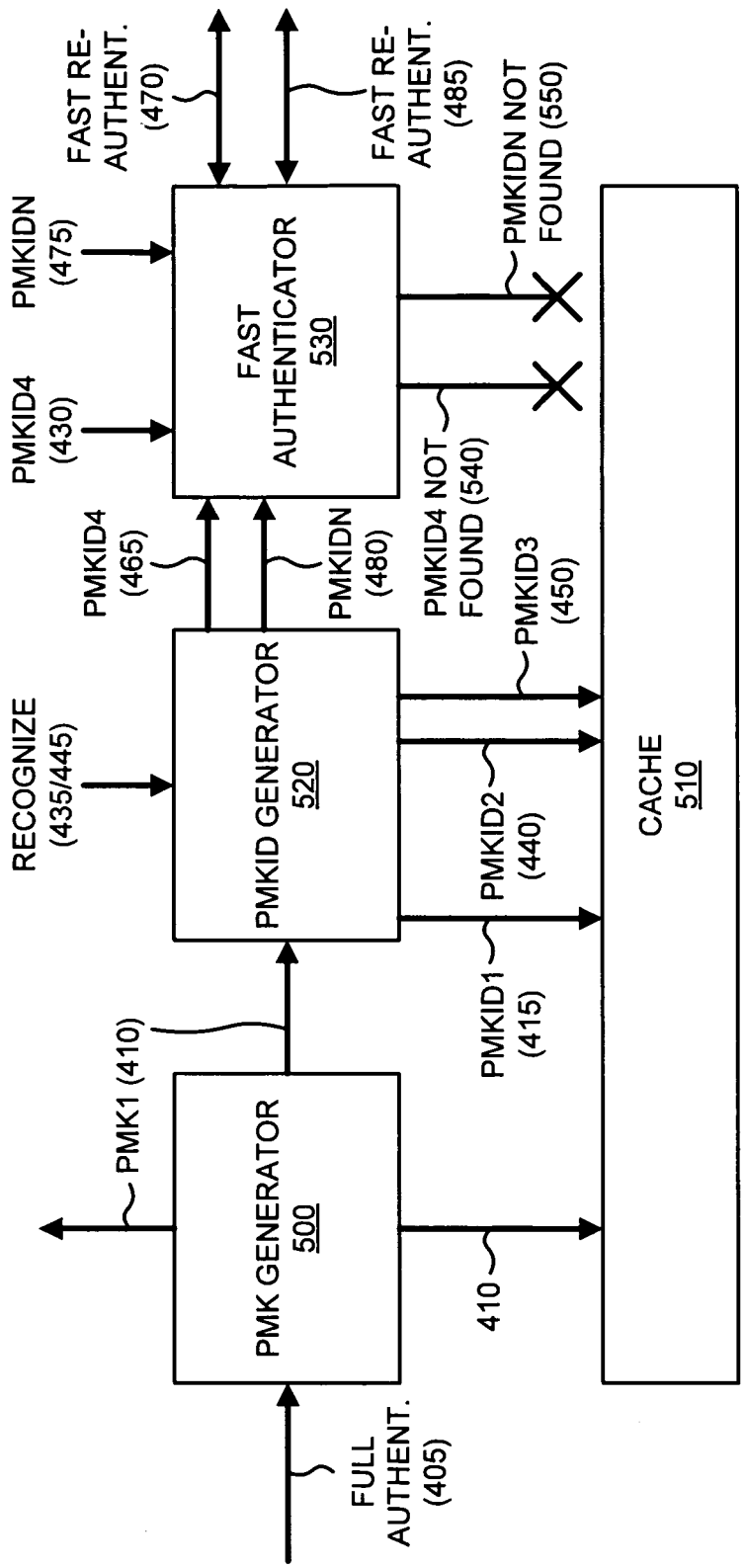
FIG. 5 depicts a diagram of exemplary functional components of the client illustrated in FIG. 1.

FIG. 5 depicts a diagram of exemplary functional components of client 110. As shown, client 110 may include a PMK generator 500, a cache 510, a PMKID generator 520, and/or a fast authenticator 530. In one implementation, the functions described in connection with FIG. 5 may be performed by processing unit 220 (FIG. 2).

PMK generator 500 may include any hardware or combination of hardware and software that may receive information associated with full authentication 405 (e.g., a request for a password and/or other authentication information), and may generate PMK1 410 based on the information associated with full authentication 405. PMK generator 500 may provide PMK1 410 to cache 510 for storage, to PMKID generator 520, and to one of access points (e.g., access point 120-1).

Cache 510 may include a storage device (e.g., main memory 230, ROM 240, storage device 250, etc.) that may store information received by and/or generated by client 110. In one implementation, cache 510 may store one or more encryption keys (e.g., PMK1 410), one or more encryption key identifications (e.g., PMKIDs, such as PMKID1 415, PMKID2 440, etc.), etc.

PMKID generator 520 may include any hardware or combination of hardware and software that may receive PMK1 410 from PMK generator 500, and may generate PMKID1 415 based on PMK1 410. When client 110 recognizes 435 access point 120-2, PMKID generator 520 may generate speculative PMKID2 440 based on PMK1 410. When client 110 recognizes 445 access point 120-3, PMKID generator 520 may generate speculative PMKID3 450 based on PMK1 410. PMKID generator 510 may store PMKID1 415, PMKID2 440, and PMKID3 450 in cache 510.

Fast authenticator 530 may include any hardware or combination of hardware and software that may receive PMKID4 430 (e.g., from "unknown" access point 120-4), and may determine whether PMKID4 430 matches one of the PMKIDs stored in cache 510. When PMKID4 430 does not match one of the PMKIDs stored in cache 510, as indicated by reference number 540, PMKID generator 520 may dynamically generate PMKID4 465 and fast authenticator 530 may determine whether PMKID4 430 matches PMKID4 465. When PMKID4 430 matches PMKID4 465, fast authenticator 530 may perform fast re-authentication 470 with access point 120-4 to establish a secure connection between client 110 and access point 120-4. If PMKID4 430 does not match PMKID4 465, client 110 and access point 120-4 may perform a full authentication to establish a secure connection between client 110 and access point 120-4.

As further shown in FIG. 5, fast authenticator 530 may receive PMKIDN 475 (e.g., from "unknown" access point 120-N), and may determine whether PMKIDN 475 matches one of the PMKIDs stored in cache 510. When PMKIDN 475 does not match one of the PMKIDs stored in cache 510, as indicated by reference number 550, PMKID generator 520 may dynamically generate PMKIDN 480 and fast authenticator 530 may determine whether PMKIDN 475 matches PMKIDN 480. When PMKIDN 475 matches PMKIDN 480, fast authenticator 530 may perform fast re-authentication 485 with access point 120-N to establish a secure connection between client 110 and access point 120-N. If PMKIDN 475 does not match PMKIDN 480, client 110 and access point 120-N may perform a full authentication to establish a secure connection between client 110 and access point 120-N.

Although FIG. 5 shows exemplary functional components of client 110, in other implementations, client 110 may contain fewer, different, differently arranged, or additional functional components than depicted in FIG. 5. In still other implementations, one or more functional components of client 110 may perform one or more other tasks described as being performed by one or more other functional components of client 110.

Exemplary Processes

Figure 6:
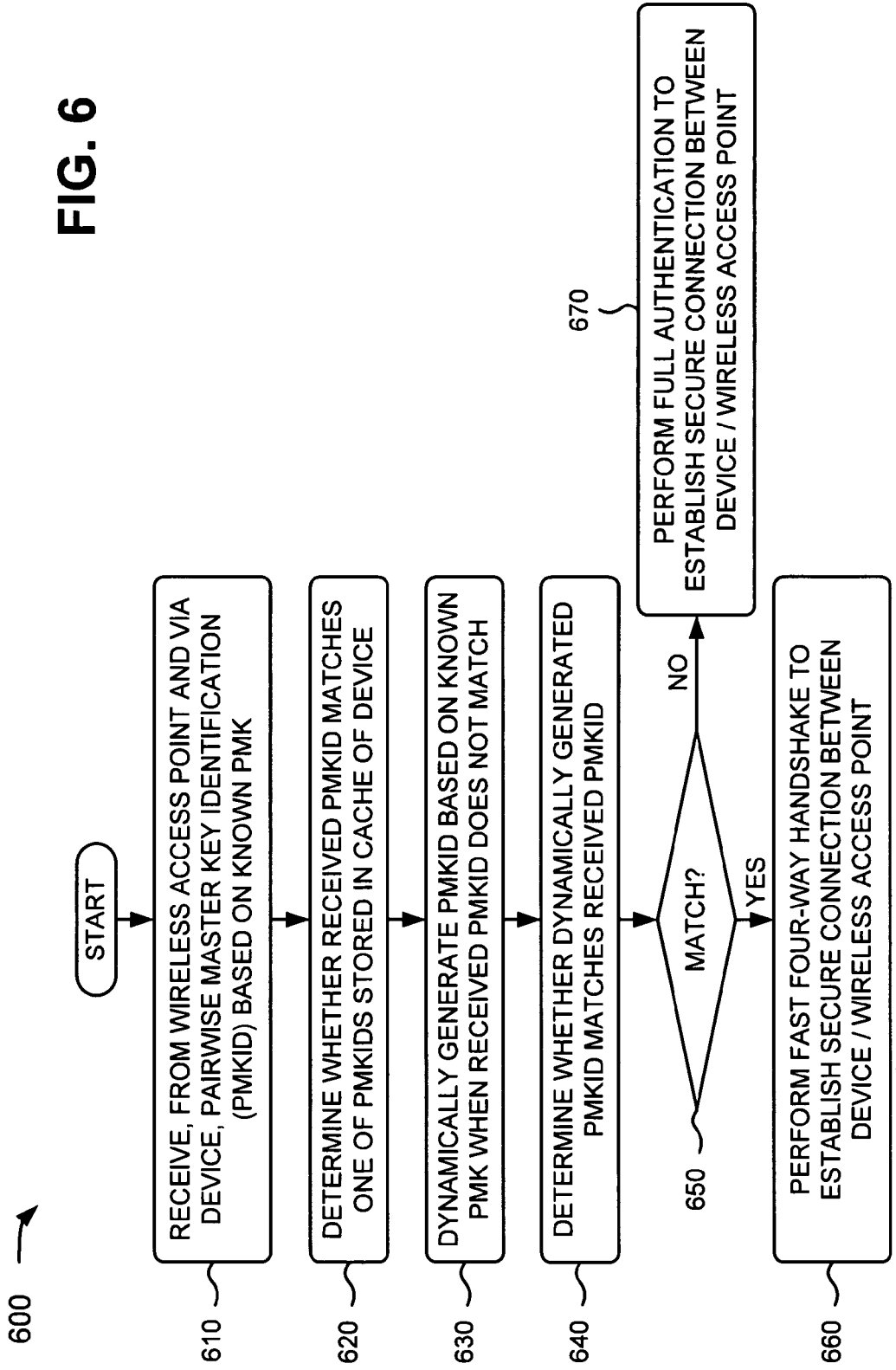
FIGS. 6 and 7 illustrate flow charts of an exemplary process for generating predictive real-time encryption key identifications according to implementations described herein.
Figure 7:
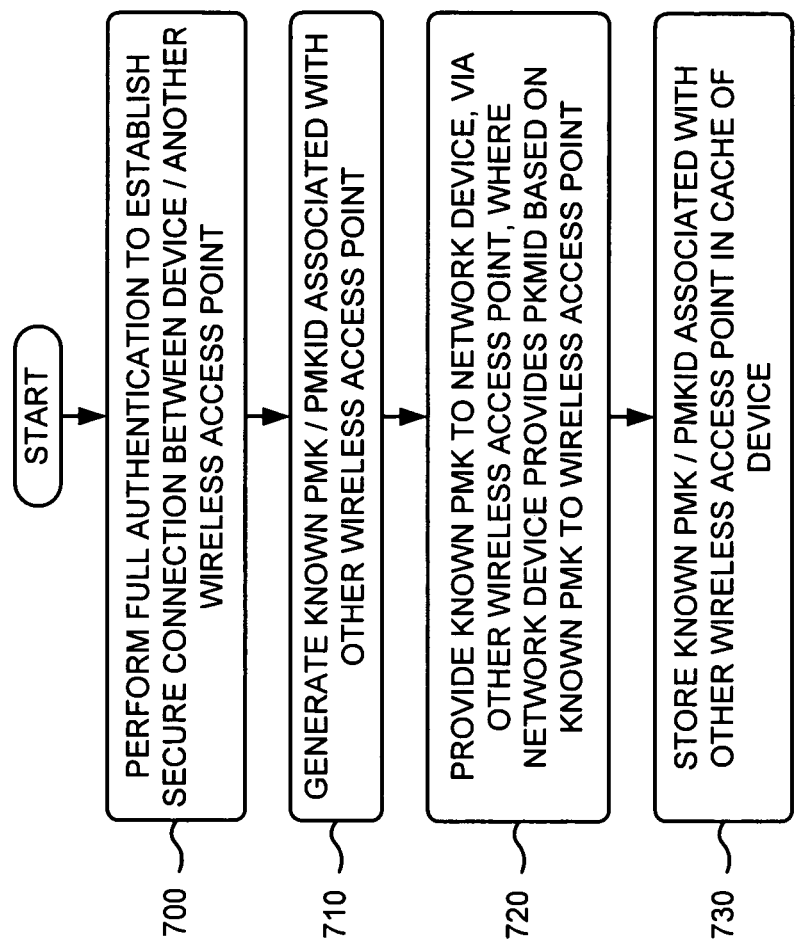

FIGS. 6 and 7 illustrate flow charts of an exemplary process 600 for generating predictive real-time encryption key identifications according to implementations described herein. In one implementation, process 600 may be performed by client 110. In another implementation, some or all of process 600 may be performed by another device or group of devices, including or excluding client 110.

As illustrated in FIG. 6, process 600 may begin with receipt, from a wireless access point and via a device, a pairwise master key identification (PMKID) based on a known PMK (block 610), and determination of whether the received PMKID matches one of the PMKIDs stored in a cache associated with the device (block 620). For example, in implementations described above in connection with FIG. 4C, access point 120-4 may provide PMKID4 430 (e.g., received from network device 130) to client 110, and client 110 may receive PMKID4 430. Client 110 may compare the received PMKID4 430 with PMKIDs stored in the cache associated with client 110. When access point 120-4 is "unknown" to client 110, the received PMKID4 430 will not match one of the PMKIDs stored in the cache associated with client 110.

As further shown in FIG. 6, a PMKID may be dynamically generated based on the known PMK when the received PMKID does not match one of the PMKIDs stored in the cache associated with the device (block 630), and it may be determined whether the dynamically generated PMKID matches the received PMKID (block 640). For example, in implementations described above in connection with FIG. 4C, when the received PMKID4 430 does not match one of the PMKIDs stored in the cache associated with client 110, client 110 may dynamically generate a PMKID (e.g., PMKID4 465) based on PMK1 410 and may store PMKID4 465 in the cache associated with client 110. Client 110 may determine whether the received PMKID 430 matches the dynamically generated PMKID4 465.

Returning to FIG. 6, if the dynamically generated PMKID matches the received PMKID (block 650—YES), a fast four-way handshake may be performed to establish a secure connection between the device and the wireless access point (block 660). If the dynamically generated PMKID does not match the received PMKID (block 650—NO), a full authentication may be performed to establish a secure connection between the device and the wireless access point (block 670). For example, in implementations described above in connection with FIG. 4C, if the received PMKID4 430 matches the dynamically generated PMKID4 465, client 110 and access point 120-4 may perform fast re-authentication 470 to establish a secure connection between client 110 and access point 120-4. Fast re-authentication 470 may include client 110 and access point 120-4 performing a fast four-way handshake to establish a secure connection between client 110 and access point 120-4. If the received PMKID4 430 does not match the dynamically generated PMKID4 465, client 110 and access point 120-4 may perform a full authentication to establish a secure connection between client 110 and access point 120-4.

Process block 610 may include the process blocks depicted in FIG. 7. As shown in FIG. 7, process block 610 may include performing an initial full authentication to establish a secure connection between the device and another wireless access point (block 700), and generating the known PMK and a PMKID associated with the other wireless access point (block 710). For example, in implementations described above in connection with FIG. 4A, client 110 may perform full authentication 405 with access point 120-1 (and/or network device 130). Full authentication 405 may include client 110 providing a password and/or other authentication information to access point 120-1. Full authentication 405 may enable client 110 to establish a secure connection with access point 120-1 so that client 110 may securely access network 150. Client 110 may generate encryption key (e.g., PMK1) 410 and PMKID1 415 based on full authentication 405.

As further shown in FIG. 7, process block 610 may include providing the known PMK to a network device, via the other wireless access point, where the network device provides the PKMID based on the known PMK to the wireless access point (block 720), and storing the known PMK and the PKMID associated with the other wireless access point in the cache associated with the device (block 730). For example, in implementations described above in connection with FIG. 4A, client 110 may provide PMK1 410 to access point 120-1, and access point 120-1 may provide PMK1 410 to network device 130. Network device 130 may receive PMK1 410 from access point 120-1, may generate PMKID2 420 for access point 120-2, may generate PMKID3 425 for access point 120-3, and may generate PMKID4 430 for access point 120-4. Network device 130 may provide PMKID2 420, PMKID3 425, and PMKID4 430 to access points 120-2, 120-3, and 120-4, respectively. Client 110 may store PMK1 410 and PMKID1 415 in a cache (e.g., provided in main memory 230, ROM 240, and/or storage device 250) associated with client 110.

Figure 8:
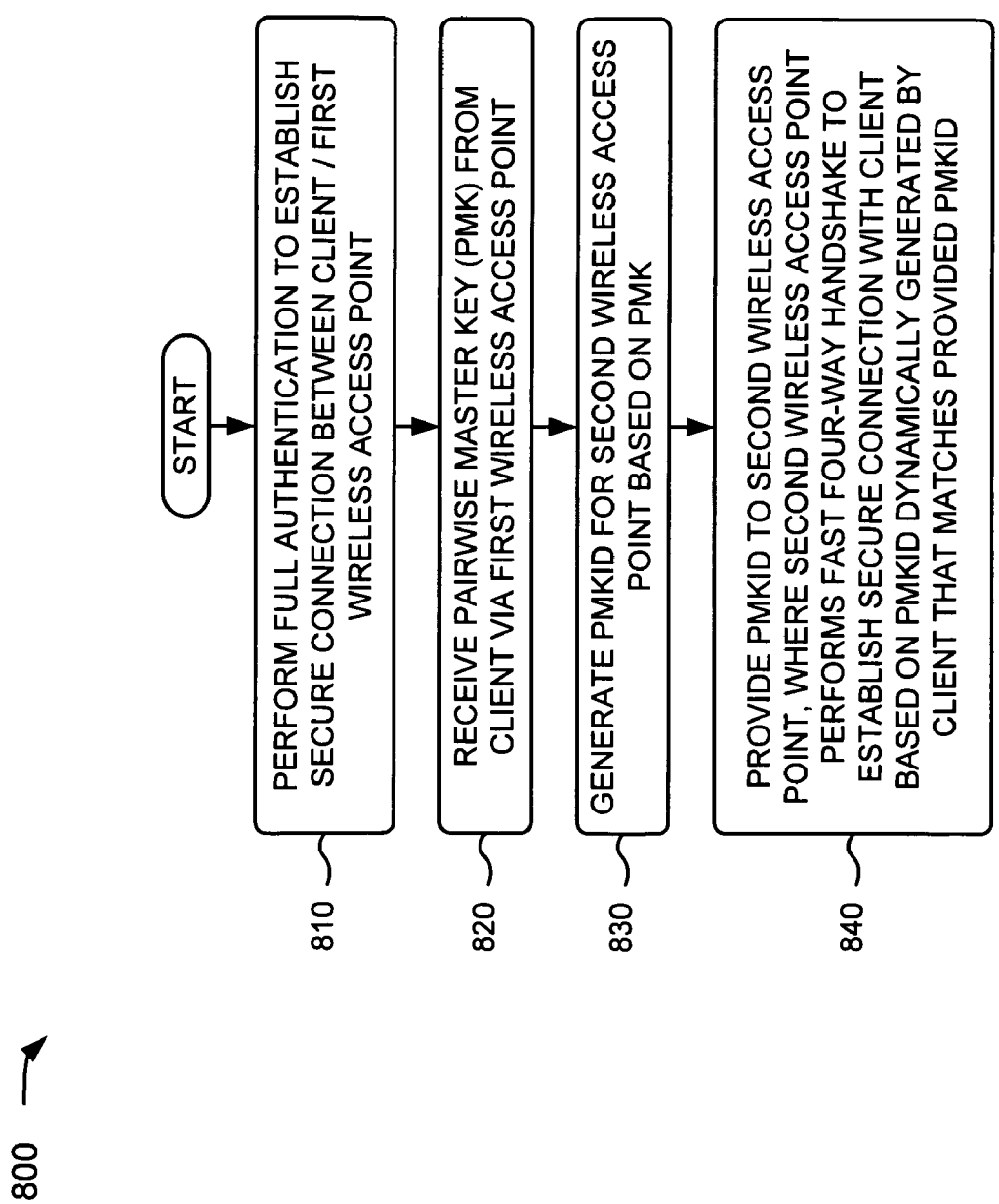
FIG. 8 depicts a flow chart of an exemplary process for performing a fast four-way handshake to establish a secure connection according to implementations described herein.

FIG. 8 depicts a flow chart of an exemplary process 800 for performing a fast four-way handshake to establish a secure connection according to implementations described herein. In one implementation, process 800 may be performed by access point 120 and/or network device 130. In another implementation, some or all of process 800 may be performed by another device or group of devices, including or excluding access point 120 and/or network device 130.

As illustrated in FIG. 8, process 800 may include performing an initial full authentication to establish a secure connection between a client and a first wireless access point (block 810), and receiving a pairwise master key (PMK) from the client via the first wireless access point (block 820). For example, in implementations described above in connection with FIG. 4A, client 110 may perform full authentication 405 with access point 120-1 (and/or network device 130). Full authentication 405 may include client 110 providing a password and/or other authentication information to access point 120-1. Full authentication 405 may enable client 110 to establish a secure connection with access point 120-1 so that client 110 may securely access network 150. Client 110 may generate encryption key (e.g., PMK1) 410 and PMKID1 415 based on full authentication 405. Client 110 may provide PMK1 410 to access point 120-1, and access point 120-1 may provide PMK1 410 to network device 130.

As further shown in FIG. 8, a PMKID for a second wireless access point may be generated based on the PMK (block 830), and the PMKID may be provided to the second wireless access point, where the second wireless access point performs a fast four-way handshake to establish a secure connection with the client based on a PMKID dynamically generated by the client that matches the provided PMKID (block 840). For example, in implementations described above in connection with FIGS. 4A and 4C, network device 130 may generate PMKID4 430 for access point 120-4 based on PMK1 410. Network device 130 may provide PMKID4 430 to access point 120-4, and access point 120-4 may provide PMKID4 430 to client 110. When the received PMKID4 430 does not match one of the PMKIDs stored in the cache associated with client 110, client 110 may dynamically generate a PMKID (e.g., PMKID4 465) based on PMK1 410 and may store PMKID4 465 in the cache associated with client 110. If the received PMKID4 430 matches the dynamically generated PMKID4 465, client 110 and access point 120-4 may perform a fast four-way handshake to establish a secure connection between client 110 and access point 120-4.

CONCLUSION

Systems and/or methods described herein may generate predictive real-time PMKIDs so that a fast four-way handshake may be used to establish a secure connection between a client and an access point. For example, in one implementation, the systems and/or methods may enable a client to recognize when an access point could potentially have been a roaming candidate, even if the access point was not reported by a wireless card associated with the client. If the access point sends a PMKID but the client does not have the PMKID cached, the client may predict that a current encryption key (e.g., a current PMK) may be correct and may dynamically generate a PMKID based on the current encryption key. If the newly-generated PMKID matches the received PMKID, the client may establish a secure connection via a fast four-way handshake and may bypass full authentication. Such an arrangement may be utilized with a network device that stores (e.g. in a cache) encryption keys for each client-access point association, or with a client that uses its current encryption key for future associations with the same network. If the client roams within a single network, a single full authentication may initially be performed and subsequent connections may use a fast four-way handshake.

The foregoing description of implementations provides illustration and description, but is not intended to be exhaustive or to limit the invention to the precise form disclosed.

Modifications and variations are possible in light of the above teachings or may be acquired from practice of the invention.

For example, while series of blocks have been described with regard to FIGS. 6-8, the order of the blocks may be modified in other implementations. Further, non-dependent blocks may be performed in parallel.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device, comprising:
    a memory to store a plurality of instructions; and
    a processor to execute instructions in the memory to:
        receive, from a wireless access point, a pairwise master key identification (PMKID) based on a known pairwise master key (PMK),
        determine whether the received PMKID matches one of a plurality of PMKIDs stored in a cache associated with the memory,
        dynamically generate a PMKID based on the known PMK when the received PMKID does not match one of the plurality of PMKIDs stored in the cache,
        determine whether the dynamically generated PMKID matches the received PMKID,
        perform a fast four-way handshake to establish a secure connection between the device and the wireless access point when the dynamically generated PMKID matches the received PMKID, and
        perform a full authentication to establish a secure connection between the device and the wireless access point when the dynamically generated PMKID does not match the received PMKID.

2. The device of claim 1, where, when receiving, from the wireless access point, the pairwise master key identification, the processor further executes instructions in the memory to:
    perform a full authentication to establish a secure connection between the device and another wireless access point,
    generate the known PMK based on the full authentication, and
    generate, based on the known PMK, a PMKID associated with the other wireless access point.

3. The device of claim 2, where, when receiving, from the wireless access point, the pairwise master key identification, the processor further executes instructions in the memory to:
    provide, via the other wireless access point, the known PMK to a network device, where the network device provides the PMKID based on the known PMK to the wireless access point.

4. The device of claim 2, where, when receiving, from the wireless access point, the pairwise master key identification, the processor further executes instructions in the memory to:
    store the known PMK and the PMKID associated with the other wireless access point in the cache associated with the memory.

5. The device of claim 1, where the device comprises one or more of:
    a radiotelephone,
    a personal communications system (PCS) terminal,
    a personal digital assistant (PDA),
    a laptop computer,
    a personal computer, or
    a network device.

6. A computing device-implemented method, the method comprising:
    generating, by a processor associated with the computing device, a plurality of encryption key identifications based on a known encryption key, each of the plurality of encryption key identifications being associated with a wireless access point of a plurality of wireless access points;
    storing the plurality of encryption key identifications in a memory associated with the computing device;
    receiving, from a wireless access point of the plurality of wireless access points and at the processor, an encryption key identification based on the known encryption key;
    determining, by the processor, whether the received encryption key identification matches one of the plurality of encryption key identifications stored in the memory;
    dynamically generating, by the processor, another encryption key identification based on the known encryption key when the received encryption key identification does not match one of the plurality of encryption key identifications stored in the memory; and
    performing, by the processor, a fast authentication to establish a secure connection between the computing device and the wireless access point when the dynamically generated encryption key identification matches the received encryption key identification.

7. The computing device-implemented method of claim 6, where:
    the encryption key identification comprises a pairwise master key identification (PMKID),
    the known encryption key comprises a known PMK,
    the dynamically generated encryption key identification comprises a dynamically generated PMKID, and
    the fast authentication comprises a fast four-way handshake between the computing device and the wireless access point.

8. The computing device-implemented method of claim 7, further comprising:
    determining, by the processor, whether the dynamically generated PMKID matches the received PMKID; and
    performing, by the processor, a full authentication to establish the secure connection between the computing device and the wireless access point when the dynamically generated PMKID does not match the received PMKID.

9. The computing device-implemented method of claim 7, further comprising:

performing, by the processor, a full authentication to establish a secure connection between the computing device and another wireless access point;
generating, by the processor, the known PMK based on the full authentication; and
generating, by the processor and based on the known PMK, a PMKID associated with the other wireless access point.

10. The computing device-implemented method of claim 9, further comprising:
providing, by the processor and via the other wireless access point, the known PMK to a network device, whether the network device provides the PMKID based on the known PMK to the wireless access point.

11. The computing device-implemented method of claim 10, further comprising:
storing the known PMK and the PMKID associated with the other wireless access point in the memory.

12. The computing device-implemented method of claim 6, where the computing device comprises one or more of:
a radiotelephone,
a personal communications system (PCS) terminal,
a personal digital assistant (PDA),
a laptop computer,
a personal computer, or
a network device.

13. A device, comprising:
a processor to:
receive, from a wireless access point, a pairwise master key identification (PMKID) based on a known pairwise master key (PMK);
determine whether the received PMKID matches one of a plurality of PMKIDs stored in a cache associated with a memory associated with the device;
dynamically generate a PMKID based on the known PMK when the received PMKID does not match one of the plurality of PMKIDs stored in the cache;
determine whether the dynamically generated PMKID matches the received PMKID;
perform a full authentication to establish a secure connection between the device and the wireless access point when the dynamically generated PMKID does not match the received PMKID; and
perform a fast four-way handshake to establish the secure connection between the device and the wireless access point when the dynamically generated PMKID matches the received PMKID.

* * * * *